United States Patent [19]
Katsuki et al.

[11] Patent Number: 6,025,424
[45] Date of Patent: Feb. 15, 2000

[54] HEAT DETERIORATION RESISTANT FLAME RETARDANT, RESIN COMPOSITION AND MOLDED ARTICLES

[75] Inventors: Keiko Katsuki; Makoto Yoshii, both of Sakaide, Japan

[73] Assignee: Kyowa Chemical Industry Co Ltd, Kagawa, Japan

[21] Appl. No.: 09/044,004

[22] Filed: Mar. 19, 1998

Related U.S. Application Data

[63] Continuation-in-part of application No. 08/767,634, Dec. 17, 1996, abandoned.

[51] Int. Cl.⁷ .................. C08K 3/10; C01F 5/14
[52] U.S. Cl. ................. 524/436; 423/635; 423/636; 524/80
[58] Field of Search ............. 524/436; 423/635, 423/636

[56] References Cited

U.S. PATENT DOCUMENTS

| | | |
|---|---|---|
| 2,571,983 | 10/1951 | Woodward et al. ........ 423/636 |
| 3,307,907 | 3/1967 | Benning ................. 423/636 |
| 4,098,762 | 7/1978 | Miyata et al. . |
| 4,145,404 | 3/1979 | Miyata et al. . |
| 4,698,379 | 10/1987 | Nakaya et al. ........... 423/635 |
| 5,143,965 | 9/1992 | Mertz . |
| 5,476,642 | 12/1995 | Skubla et al. ........... 423/635 |
| 5,872,169 | 2/1999 | Elsner et al. ........... 524/436 |

FOREIGN PATENT DOCUMENTS

| | | |
|---|---|---|
| 370728A | 5/1990 | European Pat. Off. . |
| 384603A | 8/1990 | European Pat. Off. . |
| 52-115799 | 9/1977 | Japan . |
| 514081A | 6/1978 | United Kingdom . |
| WO 95/19935 | 7/1995 | WIPO . |

OTHER PUBLICATIONS

Raff et al—Crystalline Olefin Polymers—Part II 382–383, Interscience Pub., 1964.

Chevassus et al—The Stabilization of Polyvinyl Chloride, 214–217, St. Martin's Press, 1963.

*Primary Examiner*—Veronica P. Hoke

[57] ABSTRACT

A flame retardant having heat deterioration resistance which is composed of magnesium hydroxide particles having (i) an average secondary particle diameter, measured by a laser diffraction scattering method, of not more than 2 $\mu$m, (ii) a specific surface area, measured by a BET method, of not more than 20 m²/g and containing (iii) a total amount of an iron compound and a manganese compound of not more than 0.02% by weight in terms of metals, and a synthetic resin composition comprising the same and a molded article therefrom.

25 Claims, No Drawings

HEAT DETERIORATION RESISTANT FLAME RETARDANT, RESIN COMPOSITION AND MOLDED ARTICLES

CROSS-REFERENCE TO RELATED APPLICATION

This application is a continuation-in-part of the application U.S. Ser. No. 08/767,634 filed Dec. 17, 1996 now abandoned.

DETAILED DESCRIPTION OF THE INVENTION

This invention relates to a heat deterioration resistant flame retardant composed of magnesium hydroxide particles having specific properties and to a synthetic resin composition having heat deterioration resistance and flame retardancy which comprises the same in a predetermined proportion. More specifically, it relates to a flame retardant composed of magnesium hydroxide particles having specific properties, which rarely deteriorates by heat during the thermal molding of a synthetic resin and which can provide the resin with excellent heat deterioration resistance and flame retardancy and to a resin composition comprising the same in a predetermined proportion.

Further more specifically, it relates to a resin composition and a molded article comprising a relatively large amount of magnesium hydroxide particles as a flame retardant, which rarely deteriorate in physical strength by the heat degradation of the resin during molding or use and which hardly causes whitening due to the heat decomposition of the resin.

A requirement for flame retardant of synthetic resins is increasing and becoming exacting yearly. To meet such a requirement, a flame retardant comprising both an organic halide and antimony trioxide has been proposed and widely used. However, this flame retardant partially decomposes during molding and generates a halogen gas. Therefore, it involves various problems that it corrodes processing and molding machines, is harmful to workers, has an adverse effect on the heat resistance or weatherability of a resin and rubber, and generates a large amount of smoke containing a toxic gas when waste molded articles are burnt.

Therefore, a demand for a non-halogen flame retardant involving none of the above problems has been increasing and much attention is being paid to aluminum hydroxide particles or magnesium hydroxide particles, for example.

However, since aluminum hydroxide starts dehydration at a temperature of about 190° C. and causes a foaming trouble in its molding, its molding temperature must be maintained at less than 190° C. Consequently, it has such a problem that kinds of resins to which it can be applied are limited.

On the other hand, since magnesium hydroxide particles start dehydration at about 340° C., it has such an advantage that it can be applied to almost all kinds of resins. Further, Laid-open Japanese Patent Application No. 115799/1977 teaches that a satisfactory molded article can be obtained by the development of a new method for synthesizing magnesium hydroxide particles having high crystallization.

That is, the above publication proposes magnesium hydroxide particles having specific properties, which experience a smaller structural distortion and less secondary agglomeration of particles and contain less residual water molecules and air than the conventional magnesium hydroxide particles. This publication also teaches that the magnesium hydroxide particles have good affinity with a resin such as polyolefin and produces no silver streak during molding, and a molded article having good appearance can be obtained therefrom, and that a polypropylene resin molded article having flame-retardancy which satisfies V-O in UL Standard 94 VE can be obtained.

However, although the magnesium hydroxide particles have appropriate properties as a flame-retardant molded article when filled in a resin, it has been found that they have still problems to be solved along with a recent increasing demand for properties.

That is, in order to meet V-O of UL-94 Flame Retardancy Standards with a ⅛-inch to ¹⁄₁₆-inch thick product obtained by compounding magnesium hydroxide particles with a synthetic resin and, the magnesium hydroxide particles must be comprised in an amount of about 150 to 250 parts by weight based on 100 parts by weight of the resin. The compounding of such a relatively large amount of the magnesium hydroxide particles promotes the deterioration of a molded article by heat during molding or use and reduces the physical properties of the molded article, particularly Izod impact strength, elongation, tensile strength and the like.

An object of the present invention is, therefore, to solve the above problems and is to provide a new flame retardant composed of magnesium hydroxide particles and having excellent heat deterioration resistance and a resin composition comprising the same, which has heat deterioration resistance and flame retardancy.

To attain the above object, the inventors of the present invention have conducted extensive studies on the purity and physical properties of magnesium hydroxide particles. As a result, it has been found that both the total amount of particular metal compounds as impurities contained in the magnesium hydroxide particles and the values of average secondary particle diameter and specific surface area have an influence on the heat deterioration of a resin and that a flame retardant having excellent heat deterioration resistance can be obtained by controlling these at specific values. The present invention has been accomplished upon this finding.

Various impurities are contained mainly in the starting materials of the magnesium hydroxide particles in their production process and mixed in the magnesium hydroxide particles as a solid solution or impurities. According to studies conducted by the inventors, it has been discovered that, when trace amounts of an iron compound and a manganese compound are present, they affect the heat deterioration of a resin even when they are contained as a solid solution or an admixture.

Thus, studies conducted by the inventors have revealed that when high-purity magnesium hydroxide particles contain less than a predetermined total amount of an iron compound and a manganese compound as impurities and have an average secondary particle diameter of not more than 2 μm (this means that most particles are primary particles which do not undergo secondary agglomeration) and a specific surface area of not more than 20 m²/g, a resin composition and a molded article which rarely deteriorate in physical properties by heat can be obtained.

According to the present invention, the above object of the present invention can be attained by a flame retardant having heat deterioration resistance, which is composed of magnesium hydroxide particles having (i) an average secondary particle diameter, measured by a laser diffraction scattering method, of not more than 2 μm, (ii) a specific surface area, measured by a BET method, of not more than 20 m²/g and containing (iii) a total amount of an iron compound and a manganese compound of not more than 0.02% by weight in terms of metals.

According to the present invention, another object of the present invention can be attained by a synthetic resin composition having heat deterioration resistance and flame retardancy, which comprises (a) a synthetic resin and (b) magnesium hydroxide particles contained in a proportion of 15 to 80% by weight based on the total weight of (a) and (b), the magnesium hydroxide particles having (i) an average secondary particle diameter, measured by laser diffraction scattering method, of not more than 2 μm, (ii) a specific surface area, measured by a BET method, of not more than 20 m$^2$/g and containing (iii) a total amount of an iron compound and a manganese compound of no more than 0.02% by weight in terms of metals; and a molded article therefrom.

The present invention is described in detail hereinbelow.

The magnesium hydroxide particles in the present invention have an average secondary particle diameter, measured by a laser diffraction scattering method, of not more than 2 μm, preferably 0.4 to 1.0 μm and are rarely or slightly subjected to secondary agglomeration. The magnesium hydroxide particles have a specific surface area, measured by a BET method, of not more than 20 m$^2$/g, preferably 1 to 10 m$^2$/g. Further, the magnesium hydroxide particles of the present invention contain an iron compound and a manganese compound as impurities in a total amount of not more than 0.02% by weight, preferably not more than 0.01% by weight, in terms of metals.

The total amount in terms of metals of (Fe+Mn) as the impurities contained in the magnesium hydroxide particles of the present invention is in the above range, as described above. More preferably, it is desirable that the total amount of the metals of heavy metal compounds including a cobalt compound, chromium compound, copper compound, vanadium compound and nickel compound is in the above range. That is, it is more advantageous that the magnesium hydroxide particles have a total content of metals (Fe+Mn+Co+Cr+Cu+V+Ni) of not more than 0.02% by weight, preferably not more than 0.01% by weight.

As the total content of an iron compound and a manganese compound in the magnesium hydroxide particles increases, the thermal stability of a resin compounded with the particles becomes greatly deteriorated. However, even when the total content of the iron compound and manganese compound is in the above range, the resin comprising such magnesium hydroxide particles cannot attain excellent thermal stability and be prevented deterioration in physical properties. In addition to the above, it is necessary that the above average secondary particle diameter and specific surface area satisfy the above respective ranges as well. As the average secondary particle diameter increases, the contact area between the particles and the resin decreases and thermal stability is improved. Instead, such problems occur as deterioration in mechanical strength and poor outer appearance.

As described above, when the magnesium hydroxide particles have (i) an average secondary particle diameter, (ii) a specific surface area and (iii) the total content of an iron compound and a manganese compound (and/or other metal compounds) within the above respective ranges, a resin composition which satisfies such properties as compatibility with a resin, dispersibility, moldability, workability, outer appearance of a molded article thereof, mechanical strength and flame retardancy can be obtained.

A method for producing the magnesium hydroxide particles in the present invention is not particularly limited as far as they satisfy the above requirements (i), (ii) and (iii). The magnesium hydroxide particles that satisfy requirements for (i) average secondary particle diameter and (ii) specific surface area can be produced by employing a method and conditions described in Laid-open Japanese Patent Application No. 115799/1977, for example. That is, the magnesium hydroxide particles can be produced by heating magnesium chloride or magnesium nitrate and an alkali substance such as alkali metal hydroxide, ammonium or magnesium oxide as starting materials in an aqueous medium under a pressurized condition (preferably 5 to 30 kg/cm$^2$). In the above production, by selecting starting materials containing no impurities or trace amounts of impurities, especially an iron compound and a manganese compound (and/or other metal compounds described above), magnesium hydroxide particles satisfying the above requirement (iii) can be obtained.

If necessary, it is preferred that the magnesium chloride or magnesium nitrate and the alkali substance as starting materials be purified to reduce contents of an iron compound and a manganese compound therein.

Typical industrial resources of magnesium chloride which is a raw material used for the production of magnesium hydroxide include brine, minerals (dolomite and magnesite), sea water and ion bittern. These industrially usable resources of magnesium chloride have both merits and demerits when seen as starting materials for obtaining high-purity magnesium hydroxide. First of all, brine is an abundant resource and an important source for magnesium chloride (see column 3, lines 46–53 of U.S. Pat. No. 5,143,965). However, since brine contains many heavy metals such as Fe and Mn in large quantities, it is not suitable as a starting material for the production of high-purity magnesium hydroxide as it is. To reduce the contents of Fe and Mn in brine to desired levels, special purifying means as shown in Examples to be described later is required.

On the other hand, natural minerals such as dolomite and magnesite as resources of magnesium contain larger quantities of heavy metals than brine and are not suitable as starting materials for the production of high-purity magnesium hydroxide.

There is an abundance of sea water on the earth but its content of magnesium chloride is small. Therefore, it is disadvantageous to use it as an industrial starting material in the present invention. However, ion bittern derived from sea water contains relatively small quantities of heavy metals and is suitable as a source for magnesium chloride for obtaining high-purity magnesium hydroxide. This ion bittern is a by-product obtained from the ion exchange treatment of sea water and the amount used as an industrial starting material is limited. This ion bittern is an extremely limited starting material and it is difficult to acquire it in a large quantity.

As described above, when available resources are evaluated as starting materials for the industrial production of high-purity magnesium hydroxide, there are few which have extremely small contents of heavy metals and are available in abundance.

To produce high-purity magnesium hydroxide on an industrial scale, magnesium chloride having high purity must be used as a raw material as a matter of course. However, to obtain magnesium hydroxide having extremely small contents of Fe and Mn, other conditions must be further satisfied. One of the other conditions is that a high-purity alkali substance (such as alkali hydroxide metal, ammonia or magnesium oxide) to be reacted with magnesium chloride is required. Another one of the other conditions is that special care must be taken for the materials of production devices.

In other words, an alkali substance having extremely small contents of undesirable heavy metals must be used and the materials of the production devices must have corrosion protection properties which can suppress the dissolution of heavy metals from the devices under the production conditions. These are essential conditions for the production of high-purity magnesium hydroxide of interest.

To summarize these conditions, in the industrial production of high-purity magnesium hydroxide to be used in the present invention, the following requirements (1) to (3) must be satisfied.
(1) Magnesium chloride having extremely small contents of undesirable heavy metals (such as Fe and Mn) must be used.
(2) An alkali substance having extremely small contents of undesirable heavy metals must be used.
(3) Production devices made from materials which can suppress the dissolution (pollution) of undesirable heavy metals must be used in the production process of magnesium hydroxide.

These requirements are related to one another to obtain the high-purity magnesium hydroxide of interest. For example, the kind and purity of the alkali substance and further the materials of the devices are selected according to the kind (brine, sea water or ion bittern), purifying means and purity of a resource used as a starting material for magnesium chloride. For the selection of the materials of the devices, operation conditions (such as temperature, time and pH) and operation means are taken into consideration. The devices include a reactor, transport tube, storage tank, autoclave, stirrer, dehydrator, drier, grinder or the like.

Since magnesium hydroxide particles having small contents of at least iron and manganese are used in the present invention, devices made from anticorrosive materials which can suppress the dissolution or pollution of metals should be used for the production of the magnesium hydroxide particles. The anticorrosive materials include alloy steels such as austenite, ferrite, ferrite austenite double-phase, martensite and Hastelloy steels, as exemplified by stainless steels such as SUS316, SUS317 and SUS304. The devices may be lined with a synthetic resin or made from an anticorrosive material such as a reinforced plastic. The use of carbon steel or low alloy steel is not preferred because it causes the dissolution of an undesirable metal.

A description will be subsequently given of a method for producing high-purity magnesium hydroxide particles of interest using brine which is a typical resource worldwide as a source for magnesium chloride. Details thereof are given in Examples to be described later.
(1) The composition of brine is different by each district where it is produced. As shown in Examples to be described later, for example, 1 liter of unpurified brine contains about 300 g of magnesium chloride, about 66 mg of an iron compound and 3.5 mg of a manganese compound.
This unpurified brine is left to stand for several days, most (for example, 70 to 80%) of the supernatant thereof is extracted, calcium chloride, barium chloride, peroxide or an aqueous solution thereof is added to the supernatant and stirred, and a precipitate and fine powders are separated by filtration with a filter having low permeability to obtain purified brine. By this operation, about 50 to 99.9% by weight of the iron compound and the manganese compound are removed and most of a sulfur compound is also removed.
(2) Purified brine obtained in the above step is transferred to a reactor. An aqueous solution of caustic soda is injected into the reactor to carry out a reaction so as to obtain a suspension of magnesium hydroxide particles. The amount of the caustic soda is controlled to about 0.7 to 1.0 equivalent of magnesium chloride contained in the purified brine.
(3) The suspension obtained in the above step (2) is transferred to an autoclave to carry out a hydrothermal treatment at about 105 to 250° C. for about 0.1 to 15 hours.
(4) The suspension is dehydrated by a dehydrator to produce a cake, and the cake is washed with soft water in an amount 0.1 to 30 times the weight of the cake.
(5) The cake washed with water is transferred to a drier to be dried and then transferred to a grinder to be ground. Thus, high-purity magnesium hydroxide particles of interest are obtained.

When ion bittern by-produced after the ion exchange treatment of sea water is used as a starting material, the bittern contains only trace amounts of an iron compound and a manganese compound. However, even when this bittern is used as a starting material, as is obvious from Referential Examples to be described later, if an impure alkali substance is used or devices made from inappropriate metal materials are used, high-purity magnesium hydroxide particles of interest cannot be obtained. Therefore, even when ion bittern is used as a source for magnesium chloride, much care must be taken for the quality of the alkali substance and the materials of the devices.

Although the magnesium hydroxide particles of the present invention may be filled in a resin directly as a flame retardant having heat deterioration resistance, they may be used after treated with a surface treating agent. The surface treating agent is at least one selected from the group consisting of higher fatty acids, anionic surfactants, phosphoric esters, silane coupling agents, titanate coupling agents, aluminum coupling agents, and esters of polyhydric alcohols and fatty acids.

Preferred examples of the surface treating agent include higher fatty acids having 10 or more carbon atoms such as stearic acid, erucic acid, palmitic acid, lauric acid and behenic acid; alkali metal salts of the above higher fatty acids; sulfuric acid ester salts of higher alcohols such as stearyl alcohol and oleyl alcohol; anionic surfactants such as sulfuric ester salts, amide-bonded sulfuric acid ester salts, ester-bonded sulfuric acid ester salts, ester-bonded sulfonates, amide-bonded sulfonic acid salts, ether-bonded sulfonic acid salts, ether-bonded alkyl aryl sulfonic acid salts, ester-bonded alkyl aryl sulfonic acid salts and amide-bonded alkyl aryl sulfonic acid salts of polyethylene glycol ethers; acidic and alkaline metal salts and amine salts of phosphoric acid esters of mono- or di-esters or mixtures of orthophosphoric acid and oleyl alcohol or stearyl alcohol; silane coupling agents such as vinylethoxysilane, vinyl-tris (2-methoxy-ethoxy)silane, γ-methacryloxypropyltrimethoxysilane, γ-aminopropyltrimethoxysilane, β-(3,4-epoxycyclohexyl) ethyltrimethoxysilane, γ-glycidoxypropyltrimethoxysilane and γ-mercaptopropyltrimethoxysilane; titanate coupling agents such as isopropyltriisostearoyltitanate, isopropyltris (dioctylpirophosphate)titanate, isopropyltri(N-aminoethyl-aminoethyl)titanate and isopropyltridecylbenzene-sulfonyltitanate; aluminum coupling agents such as acetoalkoxyaluminum diisopropyrate; esters of polyhydric alcohols and fatty acids such as glycerin monostearate and glycerine monooleate.

To effect a coating on the surfaces of the magnesium hydroxide particles with the above surface treating agent, a known wet or dry method can be used. For example, in a wet method, the surface treating agent in a liquid or emulsion form is added to the slurry of magnesium hydroxide and mechanically fully mixed at a temperature of up to about 100° C. In a dry method, the surface treating agent in a liquid, emulsion or solid form is added to magnesium hydroxide powders and mixed fully with a mixer such as a Henschel mixer thorough stirring with or without heating. The amount of the surface treating agent may be suitably selected but preferably about 10% by weight or less based on the weight of the magnesium hydroxide particles.

Such means as water-washing, dehydration, granulation, drying, pulverization, classification and the like are suitably selected and carried out on the thus surface-treated magnesium hydroxide particles as required to obtain a final product.

The magnesium hydroxide particles of the present invention are comprised in the resin in an amount of 15 to 80% by weight, preferably 20 to 70% by weight, based on the total of the particles and the resin.

As the synthetic resin to be compounded with the magnesium hydroxide particles of the present invention, any synthetic resin which is generally used as a molded article is acceptable. Illustrative examples of the thermoplastic resin include polyethylene, polypropylene, ethylene-propylene copolymer, polymers and copolymers of $C_2$ to $C_8$ olefins (α-olefin) such as polybutene, poly(4-methylpentene-1) or the like, copolymers of these olefins and diene, ethylene-acrylate copolymer, polystyrene, ABS resin, AAS resin, AS resin, MBS resin, ethylene-vinyl chloride copolymer resin, ethylene-vinyl acetate copolymer resin, ethylene-vinyl chloride-vinyl acetate graft polymer resin, vinylidene chloride, polyvinyl chloride, chlorinated polyethylene, chrolinated polypropylene, vinyl chloride-propylene copolymer, vinyl acetate resin, phenoxy resin, polyacetal, polyamide, polyimide, polycarbonate, polysulfone, polyphenylene oxide, polyphenylene sulfide, polyethylene terephthalate, polybutylene terephthalate, methacrylic resin and the like.

Of the above thermoplastic resins, polyolefins and copolymers thereof which have excellent flame retardant and heat deterioration prevention effects and mechanical strength retaining properties due to the magnesium hydroxide particles are preferred, as exemplified by polypropylene-based resins such as polypropylene homopolymers and ethylene-propylene copolymers; polyethylene-based resins such as high-density polyethylene, low-density polyethylene, straight-chain low-density polyethylene, ultra low-density polyethylene, EVA (ethylene-vinyl acetate resin), EEA (ethylene-ethyl acrylate resin), EMA (ethylene-methyl acrylate copolymer resin), EAA (ethylene-acrylic acid copolymer resin) and ultra high molecular weight polyethylene; and polymers and copolymers of $C_2$ to $C_6$ olefins (α-olefin) such as polybutene and poly(4-methylpentene-1).

Further, thermosetting resins such as epoxy resin, phenol resin, melamine resin, unsaturated polyester resin, alkyd resin and urea resin and synthetic rubbers such as EPDM, butyl rubber, isoprene rubber, SBR, NIR, urethanerubber, polybutadiene rubber, acrylic rubber, silicone rubber, fluorelastmer, NBR and chlorosulfonated polyethylene are also included.

The resin composition of the present invention essentially consists of (a) the above synthetic resin and (b) the magnesium hydroxide particles as described above. The resin composition may further contain a slight amount of an auxiliary flame retardant (c). By compounding this auxiliary flame retardant (c), the amount of the magnesium hydroxide particles (b) to be contained can be reduced and a flame retarding effect can be increased.

The auxiliary flame retardant (c) is preferably red phosphorus, carbon powder or a mixture thereof. As the red phosphorus may be used red phosphorus whose surface is coated with a thermosetting resin, polyolefin, carboxylic acid polymer, titanium oxide or titanium aluminum condensation product in addition to ordinary red phosphorus. The carbon powder is selected from carbon black, activated carbon and graphite, and the carbon black may be prepared by any of oil furnace, gas furnace, channel, thermal and acetylene methods.

When the auxiliary flame retardant (c) is compounded, the proportion thereof is 0.5 to 20% by weight, preferably 1 to 15% by weight based on the total weight of (a) the synthetic resin and (b) the magnesium hydroxide particles.

The resin composition of the present invention may be produced by mixing (a) the synthetic resin, (b) the magnesium hydroxide particles and as required,(c) the auxiliary flame retardant by known means in the respective proportions described above.

The resin composition having heat deterioration resistance and flame retardancy, provided by the present invention, may contain other commonly used additives in addition to the above components. The additives include an antioxidant, antistatic agent, pigment, foaming agent, plasticizer, filler, reinforcing agent, organic halogen flame retardant, crosslinking agent, optical stabilizer, ultraviolet absorber, lubricant or the like.

The following examples are given to further illustrate the present invention. "%" means % by weight in the examples. The proportion of the comprised antioxidant is expressed in percentage (%) based on the total weight of (a) the synthetic resin, (b) the magnesium hydroxide particles and (c) the auxiliary flame retardant.

In the following examples, (i) the average secondary particle diameter and (ii) the BET specific surface area of the magnesium hydroxide particles are values measured in accordance with measurement methods described below.

(1) Average secondary particle diameter of magnesium hydroxide secondary particles This is determined by measuring with the MICROTRAC Particle Size Analyzer SPA Type (manufactured by LEEDS & NORTHRUP INSTRUMENTS, LTD.).

700 mg of sample powders are added to 70 ml of water and dispersed into the water by ultrasonic wave (Model US-300 manufactured by Nissei Co., Ltd., electric current: 300 $\mu$A) for 3 minutes. 2 to 4 ml of the resulting dispersion is sampled and added to the sample container of the particle size analyzer containing 250 ml of deaerated water. After the analyzer is activated to circulate the suspension for 8 minutes, the particle size distribution is measured. The measurement is made two times and an average value of the 50% cumulative secondary particle diameters obtained by these measurements is calculated and taken as the average secondary particle diameter of the sample.

(2) Specific surface area measured by BET method of magnesium hydroxide particles This is measured by a liquid nitrogen adsorption method.

(3) Izod impact strength

This is measured in accordance with JIS K 7110.

(4) Tensile strength

This is measured in accordance with JIS K 7113.

(5) Flame retardancy

This is measured in accordance with the UL 94VE method. Oxygen index is measured in accordance with JIS K7201.

(6) Analysis of heavy metals

This is conducted in accordance with the ICP-MS (Inductively coupled plasma-mass spectrometry) or atomic absorption spectrometry.

EXAMPLE 1
Properties of Magnesium Hydroxide Particles

The average secondary particle diameter, specific surface area and heavy metal content of various kinds of magnesium hydroxide particles to be tested were measured and shown in Table 1 below. "%" means % by weight.

TABLE 1

| Composition and properties | Sample | | | | |
|---|---|---|---|---|---|
| | A-I | A-II | B-I | B-II | B-III |
| Average secondary particle diameter (μm) | 1.2 | 0.60 | 4.63 | 2.97 | 0.8 |
| Specific surface area (m²/g) | 10.8 | 6.5 | 3.9 | 10.9 | 5.4 |
| $Mg(OH)_2$ (%) | 99.19 | 99.60 | 93.80 | 90.80 | 99.40 |
| CaO (%) | 0.189 | 0.01 | 1.31 | 2.21 | 0.01 |
| $CO_2$ (%) | 0.31 | 0.15 | 4.15 | 6.0 | 0.29 |
| Fe (%) | 0.0069 | 0.0028 | 0.188 | 0.279 | 0.225 |
| Mn (%) | 0.0013 | 0.0001≧ | 0.025 | 0.027 | 0.024 |
| Cu (%) | 0.0011 | 0.0001 | 0.0068 | 0.0079 | 0.007 |
| V (%) | 0.0001≧ | 0.0001≧ | 0.0001≧ | 0.0001≧ | 0.0001≧ |
| Co (%) | 0.0001≧ | 0.0001≧ | 0.0001≧ | 0.0001≧ | 0.0001≧ |
| Ni (%) | 0.0022 | 0.0009 | 0.0081 | 0.0098 | 0.008 |
| Cr (%) | 0.0001≧ | 0.0001≧ | 0.0005 | 0.0018 | 0.0003 |

(Note)
The compositions of A-I and A-II are those of the present invention, while the compositions of B-I, B-II and B-III are those for Comparative example.

EXAMPLE 2
Evaluation of Thermal Stability and Physical Properties of Resin Composition The magnesium hydroxide particles shown in Table 1 of Example 1 were used to prepare test pieces having the following compositions.

60% magnesium hydroxide particles (surface-treated with 3% by weight of stearic acid)

40% polypropylene (of an impact resistant grade with an MFI of 2 g/10 min.)

0.1% antioxidant (Irganox 1010 of Ciba Geigy AG)

0.1% antioxidant (DLTP of Yoshitomi Pharmaceutical Industries, Ltd.)

(i) Preparation of Test Piece

Each sample of surface-treated magnesium hydroxide particles was dried at 105° C. for 16 hours and further at 120° C. for 2 hours to remove water adhered thereto, kneaded with a resin (polypropylene) and an antioxidant by a biaxial extruder (BT-30-S2-30-L manufactured by Plastic Kogaku Kenkyusho K.K.) at 230° C., dried again at 120° C. for 2 hours and molded by an injection molding machine (FS 120S 18A SE manufactured by Nissei Jushi Kogyo K.K.) at 230° C.

Test pieces obtained by injection molding are designated as follows.

Test piece A-I: Compound of magnesium hydroxide particles of sample A-I

Tests piece A-II: Compound of magnesium hydroxide particles of sample A-II

Test piece B-I: Compound of magnesium hydroxide particles of sample B-I

Test piece B-II: Compound of magnesium hydroxide particles of sample B-II

Test piece B-III: Compound of magnesium hydroxide particles of sample B-III (ii) Measurement of Thermal Stability Apparatus: GPHH-100 gear oven manufactured by Tabai Espec Co., Ltd.

Measurement conditions: 150° C., damper aperture: 50%

A set of two test pieces is nipped at a top portion with a folded paper, fastened with a metal clip, hung on a rotary ring and taken out at intervals of a certain period of time.

test piece: 1/12 inch

Evaluation: The time passed until whitening becomes observed in the test piece is taken as an index for heat deterioration. The time passed until the weight of the test piece is reduced by 10% at 150° C. is also checked.

(iii) Evaluation Result

Evaluation results are shown in Table 2 below.

TABLE 2

| Test piece | A-I | A-II | B-I | B-II | B-III |
|---|---|---|---|---|---|
| Number of days passed before whitening | 13.5 | 27 | 6.0 | 3.5 | 4.0 |
| Izod impact (notched: kgfcm/cm) | 11 | 14.0 | 4.2 | 4.8 | 15.5 |
| Tensile strength (kgf/mm²) | 1.73 | 2.00 | 1.65 | 1.71 | 2.03 |
| 10 wt % weight reduction (time) | 380 | 820 | 125 | 120 | 120 |
| Flame retardancy (UL 94VE 1/8 inch) | V-O | V-O | Outside standard | Outside standard | V-O |

EXAMPLE 3

The same test as in Example 2 was made using various kinds of magnesium hydroxide particles which differ in average secondary particle diameter. The results are shown in Table 3 below. In Table 3, "total content of heavy metals (%)" indicates the total content of metals (Fe+Mn+Co+Cr+Cu+V+Ni).

TABLE 3

| Magnesium hydroxide particles | A-III | A-IV | A-V | B-IV | B-V |
|---|---|---|---|---|---|
| Average secondary particle diameter | 0.40 | 1.0 | 1.5 | 11.1 | 6.35 |
| Specific surface area | 18.0 | 8.0 | 11 | 16.0 | 59.0 |
| Content of magnesium hydroxide | 99.82 | 99.85 | 99.86 | 99.85 | 99.83 |
| Total content of heavy metals | 0.00505 | 0.00505 | 0.00570 | 0.01361 | 0.01065 |
| Number of days passed before whitening | 24 | 30 | 29 | 8.0 | 7.5 |
| Izod impact (notched: kgfcm/cm) | 10.8 | 13.6 | 10.7 | 3.7 | 3.9 |
| Tensile strength (kgf/mm²) | 1.90 | 1.95 | 1.88 | 1.61 | 1.50 |
| Flame retardancy (UL 94VE 1/8 inch) | V-O | V-O | V-O | Outside standard | Outside standard |

(Note) The compositions of A-III to A-V are those of the present invention, while the compositions of B-IV and B-V are those for Comparative example.

EXAMPLE 4

A resin composition having the following composition was prepared.

100 parts by weight: ethylene-vinyl acetate copolymer (containing 41% of vinyl acetate)

150 parts by weight: magnesium hydroxide particles (A-II or B-I, surface-treated with 0.25 part by weight of sodium oleate based on 100 parts by weight of the magnesium hydroxide.)

2 parts by weight: DCP (dicumyl peroxide)

1 part by weight: silane coupling agent (A-172 of Nippon Unicar Co., Ltd.)

1 part by weight: antioxidant (Irganox 1010 of Ciba Geigy AG)

Preparation of Test Piece

The above starting materials were kneaded with a monoaxial kneading extruder at 120° C., pre-molded with a compression molding machine at 120° C. for 5 minutes and crosslinked at 180° C. for 15 minutes to obtain 2 mm- and 3 mm-thick plates.

Measurement of Thermal Stability

Heat resistance: A 25 mm wide, 50 mm long test piece was obtained from the 2 mm-thick crosslinked plate and a heat resistance test was made on the test piece in the same manner as in Example 1.

Tensile strength: A JIS 7113 No. 2 test piece was obtained to measure its tensile strength at a test speed of 200 mm/min.

Evaluation Result

The results of the above measurements are shown in Table 4 below.

TABLE 4

| Magnesium hydroxide | A-II | B-I |
| --- | --- | --- |
| Number of days passed before whitening | 30 | 6 |
| Tensile strength (kgf/mm$^2$) | 1.33 | 0.89 |
| Flame retardancy (oxygen index) | 38 | 36 |

EXAMPLE 5

A resin composition having the following composition was prepared.

70%: magnesium hydroxide particles (A-II or B-III; surface-treated with 3% by weight of stearic acid)

30%: polypropylene (of an impact resistant grade with an MFI of 2 g/10 min)

0.1%: antioxidant (Irganox 1010 of Ciba Geigy AG)

0.1%: antioxidant (DLTP of Yoshitomi Pharmaceutical Industries, Ltd.)

A test piece was prepared from the above resin composition in the same manner as in Example 2 to evaluate the thermal stability and flame retardancy. The results are shown in Table 5 below.

TABLE 5

| Magnesium hydroxide particles | A-II | B-III |
| --- | --- | --- |
| Number of days passed before whitening | 22 | 3.0 |
| Izod impact (kgfcm/cm) | 6.6 | 6.3 |
| Tensile strength (kgf/mm$^2$) | 1.75 | 1.72 |
| 10 wt % weight reduction (time) | 650 | 85 |
| Flame retardancy (UL 94VE 1/16 inch) | V-O | V-O |

EXAMPLE 6

A resin composition having the following composition was prepared.

30%: magnesium hydroxide particles (A-II or B-III; surface-treated with 3% by weight of stearic acid)

7%: red phosphorus (Nova Excell 140 of Rin Kagaku Kogyo K.K.)

3%: carbon black (manufactured by an oil furnace method, FEF)

60%: polypropylene (of an impact resistant grade with an MFI of 2 g/10 min)

0.1%: antioxidant (Irganox 1010 of Ciba Geigy AG)

0.1%: antioxidant (DLTP of Yoshitomi Pharmaceutical Industries, Ltd.)

A test piece was prepared from the above resin composition in the same manner as in Example 2 to evaluate its thermal stability and flame retardancy. The results are shown in Table 6 below.

TABLE 6

| Magnesium hydroxide particles | A-II | B-III |
| --- | --- | --- |
| Number of days passed before whitening | 33 | 7.0 |
| Izod impact (kgfcm/cm) | 12.5 | 11.8 |
| Tensile strength (kgf/mm$^2$) | 2.17 | 2.13 |
| 10 wt % weight reduction (time) | 950 | 135 |
| Flame retardancy (UL 94VE 1/8 inch) | V-O | V-O |

EXAMPLE 7

The following resin compositions (1) to (3) were produced and test pieces were prepared in the same manner as in Example 2 and tested for their flame retardancy. In the case of nylon 6, kneading and injection molding are performed at 250° C. The results show that all the test pieces had flame retardancy of V-O in the UL94 VE 1/16-inch test.

(1)

65%: magnesium hydroxide particles (A-II)

35%: nylon 6 (of an injection molded grade with a specific gravity of 1.14)

0.2%: antioxidant (Irganox 1098 of Ciba Geigy AG)

(2)

68%: magnesium hydroxide particles (A-II)

32%: high-density polyethylene (of an injection molded grade with an MFI of 5.0 g/10 min)

0.1%: antioxidant (Irganox 1010 of Ciba Geigy AG)

0.1%: antioxidant (DLTP of Yoshitomi Pharmaceutical Industries, Ltd.)

(3)

20%: magnesium hydroxide particles (A-II)

7%: red phosphorus (Nova Excell 140 of Rin Kagaku Kogyo K.K.)

5%: carbon black (manufactured by an oil furnace method, FEF)

63%: ABS resin (of an impact resistant grade with an MFI of 25 g/10 min)

5%: nylon 6 (of an injection molded grade with a specific gravity of 1.14)

0.2%: antioxidant (Irganox 1010 of Ciba Geigy AG)

EXAMPLE 8

The following composition was prepared, masticated in an open roll at 70° C., and one day after, cured at 160° C.

for 30 minutes to obtain a ⅛-inch plate. A ⅛-inch thick test piece for the UL94 VE test was prepared from the thus obtained plate, and the UL 94 VE test was made on this test piece. The test result showed that the flame retardancy was V-1.

Composition 100 parts by weight: EPDM rubber (ethylene/propylene ratio=50/50 moles)

170 parts by weight: magnesium hydroxide particles (A-II)

3 parts by weight: dicumyl peroxide 0.5 part by weight: poly(2,2,4-trimethyl-1,2-dihydroquinoline)

1 part by weight: silane coupling agent (A-172 of Nippon Unicar Co., Ltd.)

1 part by weight: stearic acid 1 part by weight: sulfur

EXAMPLE 9

The following composition was prepared, kneaded with a kneader at about 30° C., and cured at 90° C. for 15 minutes to obtain a ⅛-inch plate. A ⅛-inch test piece for the UL94 VE test was prepared from the thus obtained plate, and the UL 94 VE test was made on this test piece. The result showed that the flame retardancy was V-O.

Composition 100 parts by weight: epoxy resin (specific gravity: 1.17)

100 parts by weight: magnesium hydroxide particles (A-II)

5 parts by weight: red phosphorus (Nova Excell 140 of Rin Kagaku Kogyo K.K.)

1 part by weight: carbon black (manufactured by oil furnace method, FEF)

10 part by weight: curing agent (HY951 of Ciba Geigy AG)

1 part by weight: stearic acid 0.2 part by weight: antioxidant (Irganox 1010 of Ciba Geigy AG)

REFERENTIAL EXAMPLE 1

Preparation of High-Purity Magnesium Hydroxide Particles From Natural Brine 0.9 Cubic meter of unpurified brine (starting material No. 1) collected from underground was left in a 1 m³ (1 m×1 m×1 m) tank for 4 days, and 0.7 m³ of the unpurified brine was extracted from an upper portion of the tank and transferred to another 1 m³ (1 m×1 m×1 m) tank. 202 Liters of an aqueous solution of calcium chloride (starting material No. 9) was injected into the tank, and the mixture was let pass through a filter cloth having a permeability of 0.5 (cc/min/cm²) twice to obtain purified brine (starting material No. 2) having small contents of compounds of heavy metals such as iron.

This purified brine was charged into a reactor through a transport tube and stirred completely by a stirrer.

To this was added an aqueous solution of caustic soda (starting material No. 4) whose concentration was adjusted with water (starting material No. 7) to 3 mol/l(liter) through a transport tube in an amount of 0.88 equivalent of magnesium chloride to obtain a suspension of the reaction product.

This suspension was poured into an autoclave through a transport tube immediately to be subjected to a hydrothermal treatment at 170° C. for 8 hours.

This treated suspension was transferred to a dehydrator through a transport tube to be dehydrated and caked.

The caked product was sprinkled with water (starting material No. 7) in an amount about 10 times the amount of the dried cake in the dehydrator to be washed.

This cake was transferred to a drier to be dried and then transferred to a grinder to be ground into magnesium hydroxide particles having properties shown in Table 9 (sample A-VI).

In this Referential Example 1, the compositions (analytical values) of the unpurified brine (starting material No. 1), the purified brine (starting material No. 2) and the aqueous solution of calcium chloride (starting material No. 9) are shown in Table 7 and the compositions (analytical values) of water (starting material No. 7) and the aqueous solution of caustic soda (starting material No. 4) are shown in Table 8.

In this Referential Example 1, the devices and the transport tubes used are made from the following materials.

(1) starting material tank (for brine): FRP lined SUS304

(2) starting material tank (for aqueous solution of caustic soda): SUS304

(3) transport tube (for brine): PVC tube (4) transport tube (for aqueous solution of caustic soda): SUS304

(5) transport tube (for hydrothermally treated product): SUS316L (6) reactor and autoclave: Hastelloy C276 lined SUS304

(7) stirrer: SUS316L (8) dehydrator, drier and grinder: SUS304

REFERENTIAL EXAMPLE 2

Surface Treatment of High-Purity Magnesium Hydroxide Particles With Sodium Stearate 2 Kilograms of the dried cake (magnesium hydroxide) dehydrated by the dehydrator in the above Referential Example 1 was take out and placed in a surface-treated container. Water (starting material No. 7) was added to this container to obtain a suspension containing 100 g/l of magnesium hydroxide particles. This suspension was heated at about 80° C. and stirred. An aqueous solution of 64 g of sodium stearate (starting material No. 8) dissolved in 2 l of water (starting material No. 7) heated at 80° C. was added to this suspension through the transport tube in 3 minutes. After the addition of the aqueous solution of sodium stearate, the solution was further stirred for 30 minutes. Table 8 shows the analytical values of the sodium stearate. The thus obtained surface-treated product was transferred to the dehydrator through the transport tube immediately to be dehydrated and caked. After caking, a ground sample A-VII was obtained in the same manner as in the above Referential Example 1. The properties of the particles are shown in Table 9.

In this Referential Example 2, the surface-treated container was made from SUS317, the tank and the transport tube for the aqueous solution of sodium stearate were made from SUS304, and the transport tube for the surface-treated product was made from SUS304. The materials of other devices were the same as those of Referential Example 1.

REFERENTIAL EXAMPLE 3

Preparation of Magnesium Hydroxide Particles From Unpurified Brine 0.7 Cubic meter of the unpurified brine (starting material No. 1) was charged into the reactor directly and stirred thoroughly by the stirrer as in Referential Example 1. An aqueous solution of caustic soda was added to this to obtain a suspension in the same manner as in Referential Example 1. The suspension was treated likewise to be caked. This cake was surface-treated with sodium stearate, dehydrated, dried and ground in the same manner as in Referential Example 2 to obtain magnesium hydroxide particles (sample B-VI). The properties of the particles are shown in Table 9.

REFERENTIAL EXAMPLE 4

Preparation of Magnesium Hydroxide Particles Using Slaked Product of Natural Lime as Alkali Substance A cake was obtained in the same manner as in Referential Example 1 except that a slaked product of natural lime (starting material No. 6) was used as an alkali substance in an amount of 1.5 mol/l, calculated as $Ca(OH)_2$, in place of the aqueous solution of caustic soda. This cake was surface-treated with sodium stearate, dehydrated, dried and ground in the same manner as in Referential Example 2 to obtain magnesium hydroxide particles (sample B-VII). The properties of the particles are shown in Table 9.

REFERENTIAL EXAMPLE 5

A dehydrated cake was obtained in the same manner as in Referential Example 1 except that a reactor and an autoclave produced using a carbon steel plate for medium and normal pressure containers (SGP material, JIS G3118-1977) and transport tubes (for brine, an aqueous solution of caustic soda and hydrothermally treated product) made of carbon steel tubes for pipings (SGP material, JIS G3452- 1984) were used. This cake was surface-treated with sodium stearate, dehydrated, dried and ground in the same manner as in Referential Example 2. In this Referential Example 5, the surface-treated container manufactured using a carbon steel plate for medium and normal pressure containers and the transport tube for the surface-treated product made of a carbon steel tube for pipings were used.

The properties of the obtained magnesium hydroxide particles (sample B-VIII) are shown in Table 9.

REFERENTIAL EXAMPLE 6

A cake was obtained in the same manner as in Referential Example 1 except that ion bittern (starting material No. 3) was used as a source for magnesium in place of brine, aqueous ammonia (starting material No. 5) was used as an alkali substance in place of the aqueous solution of caustic soda, and the devices of Referential Example 5 were used. The aqueous ammonia was used in such an amount that is 1.5 times the equivalent of magnesium chloride contained in the ion bittern in terms of ammonia. The obtained cake was surface-treated with sodium stearate, dehydrated, dried and ground in the same manner as in Referential Example 2 to obtain magnesium hydroxide particles (sample B-IX). The surface treatment with sodium stearate was carried out using the surface treatment apparatus and the transport tube of Referential Example 5. The properties of the obtained particles are shown in Table 9.

The analysis of starting materials and magnesium hydroxide particles in the above Referential Examples 1 to 6 was carried out in accordance with the following methods.

(1) analysis of brine, ion bittern and calcium chloride:
$MgCl_2$ and $CaCl_2$: Mg and Ca were analyzed by EDTA titration to calculate $MgCl_2$ and $CaCl_2$.
Total of chlorine atoms: absorptiometric analysis
CaO: atomic absorptiometric analysis
$CO_2$: infrared absorptiometric analysis
Fe, Mn, Cu, V, Co, Ni and Cr: atomic absorptiometric analysis or ICP-MS method
(2) analysis of alkali substance
NaOH, $NH_4OH$, $Ca(OH)_2$: hydrochloric acid back titration
Sodium stearate: JIS K 3341
$CO_2$: AGK type $CO_2$ precision quantity-determination apparatus of Tsutsui Rikagakuki Kikai K.K. or Organic substance carbon meter of Shimadzu Corp.
CaO, Fe, Mn, Cu, V, Co, Ni and Cr: fluorescent X-ray or atomic absorptiometry or ICP-MS method
(3) analysis of magnesium hydroxide particles
$Mg(CO)_2$: dissolved in hydrochloric acid and titrated by EDTA
$CO_2$: the above AGK $CO_2$ precision quantity-determination apparatus
CaO and heavy metals: fluorescent X-ray or atomic absorptiometric analysis or ICP-MS method
stearic acid: surface-treated $Mg(OH)_2$ is fractionally distilled with hydrochloric acid and ethyl ether, a hydrochloric acid component is removed and the residue is evaporated and dried to measure weight.
Others: in accordance with measuring methods described in the specification

EXAMPLE 10

Evaluation of Thermal Stability and Physical Properties of Resin Composition

Magnesium hydroxide particles obtained in the above Referential Examples 2 to 6 were used to prepare flame retardant compositions using polypropylene in the same manner as in Example 2. The flame retardancy, heat resistance and mechanical strength of each of the compositions were measured. Izod impact strength and tensile strength measurement values of each test piece heated in a gear oven at 150° C. for 10 days are also shown together with the results of a heat resistance test. These measurement results are shown in Table 10.

The following facts are understood from Table 10 which shows the evaluation results of the resin composition of Example 10.

(a) Magnesium hydroxide particles (B-VI) obtained from unpurified natural brine as a source for magnesium contain an iron compound and a manganese compound derived from the brine in large quantities as impurities (Fe+Mn=about 0.036 wt %). Therefore, the particles have very poor physical properties. Specifically stated, the number of days passed before the test piece gets whitened is very small, the Izod impact strength and tensile strength of the test piece are lowered slightly, and a 10 wt % weight reduction occurs in a short period of time. Particularly, a test piece obtained by heating at 150° C. for 10 days has physical properties reduced to the extent that it cannot be used as a molded product. Thus, the test piece of Comparative Example B-VI is unsatisfactory in terms of thermal stability.

(b) Magnesium hydroxide particles (A-VI and A-VII) produced from purified brine obtained by purifying natural brine to remove most of an iron compound and a manganese compound have extremely small contents of the iron compound and the manganese compound (Fe+Mn= 0.0005 wt % for A-VI and 0.0006 wt % for A-VII). A test piece prepared by using the above magnesium hydroxide particles has excellent thermal stability (Example A-VII).

(c) Even when purified brine is used as a starting material, magnesium hydroxide particles (B-VII) produced by using $Ca(OH)_2$ derived from natural lime as the alkali substance contain an iron compound and a manganese compound in large quantities as impurities (Fe+Mn=about 0.159 wt %). A test piece prepared by using such magnesium hydroxide particles is unsatisfactory in terms of thermal stability (Comparative Example B-VII).

(d) Even when the same purified brine and caustic soda as those of Examples (A-VI and A-VII) are used as starting materials, magnesium hydroxide particles (Referential Example 4) produced using a reactor, tank, transport tubes and other machines manufactured using general-purpose carbon steel plates and carbon steel pipes contain an iron compound and a manganese compound dissolved from or polluted by the materials of these devices as impurities (Fe+Mn=about 0.088 wt %). A test piece produced using the magnesium hydroxide particles shows a quite unsatisfactory value of thermal stability (Comparative Example B-VIII).

(e) When ion bittern and ammonia are used as starting materials for magnesium and an alkali substance, respectively, though they contain small amounts of an iron compound and a manganese compound, magnesium hydroxide particles produced using devices produced using general-purpose carbon steel plates or carbon steel pipes like Referential Example 4 contain an iron compound and a manganese compound as impurities (Fe+Mn=about 0.10 wt %). A test piece prepared using the magnesium hydroxide particles is quite unsatisfactory in terms of thermal stability (Comparative Example B-IX).

TABLE 7

| | | Starting material No. | | | |
|---|---|---|---|---|---|
| Composition | | No.1 Unpurified brine | No.2 Purified brine | No.3 Ion bittern | No. 9 Aqueous solution of calcium chloride |
| $MgCl_2$ | g/l | 314.6 | 278.9 | 168.2 | — |
| $CaCl_2$ | g/l | 0.00746 | 24.6 | 68.3 | 110.0 |
| Amount of total chlorine | g/l | 254.5 | 213.4 | 237 | 70.9 |
| CaO | g/l | 0.0038 | 12.5 | 24 | 55.8 |
| $CO_2$ | mg/l | 5.2 | 4.4 | 3.7 | 2.4 |
| Fe | mg/l | 66.0 | 1 | 1≧ | 5.3 |
| Mn | mg/l | 3.5 | 1≧ | 1≧ | 2.5 |

TABLE 7-continued

| | | Starting material No. | | | |
|---|---|---|---|---|---|
| Composition | | No.1 Unpurified brine | No.2 Purified brine | No.3 Ion bittern | No. 9 Aqueous solution of calcium chloride |
| Cu | mg/l | 1≧ | 1≧ | 4 | 1 |
| V | mg/l | 1≧ | 1≧ | 1≧ | 1≧ |
| Co | mg/l | 1≧ | 1≧ | 1≧ | 1≧ |
| Ni | mg/l | 1≧ | 1≧ | 1≧ | 1≧ |
| Cr | mg/l | 1≧ | 1≧ | 1≧ | 1≧ |

TABLE 8

| | | Starting material No. | | | | |
|---|---|---|---|---|---|---|
| Composition | | No. 4 Caustic soda (liquid state) | No. 5 Ammonia water | No. 6 Slaked product of natural lime | No. 7 Water | No. 8 Sodium stearate |
| NaOH | % | 48.7 | — | — | — | — |
| $NH_4OH$ | % | — | 25.2 | — | — | — |
| $Ca(OH)_2$ | % | — | — | 96.1 | — | — |
| $C_{17}H_{35}COONa$ | % | — | — | — | — | 93.4 |
| Ca | % | 0.001 | 0.0001≧ | — | 0.0001≧ | 0.0001≧ |
| $CO_2$ | % | 0.20 | 0.1≧ | 0.17 | 0.1≧ | 0.1≧ |
| Fe | % | 0.0001 | 0.0001≧ | 0.126 | 0.0001≧ | 0.0003 |
| Mn | % | 0.0001≧ | 0.0001≧ | 0.0105 | 0.0001≧ | 0.0001≧ |
| Cu | % | 0.0001≧ | 0.0001≧ | 0.0003 | 0.0001≧ | 0.0001≧ |
| V | % | 0.0001≧ | 0.0001≧ | 0.0001≧ | 0.0001≧ | 0.0001≧ |
| Co | % | 0.0001≧ | 0.0001≧ | 0.0001≧ | 0.0001≧ | 0.0001≧ |
| Ni | % | 0.0001≧ | 0.0001≧ | 0.0001≧ | 0.0001≧ | 0.0001≧ |
| Cr | % | 0.0001≧ | 0.0001≧ | 0.0001≧ | 0.0001≧ | 0.0001≧ |

TABLE 9

| | | Magnesium hydroxide particles | | | | | |
|---|---|---|---|---|---|---|---|
| Composition and properties | | A-VI Example | A-VII Example | B-VI Comp. Example | B-VII Comp. Example | B-VIII Comp. Example | B-IX Comp. Example |
| Average secondary particle diameter (μm) | | 0.77 | 0.81 | 0.77 | 0.64 | 0.72 | 0.80 |
| BET specific surface area ($m^2/g$) | | 6.3 | 5.8 | 6.1 | 8.7 | 6.8 | 6.5 |
| $Mg(OH)_2$ | (%) | 99.65 | 97.01 | 96.86 | 96.37 | 96.72 | 96.75 |
| CaO | (%) | 0.01≧ | 0.01≧ | 0.01≧ | 0.25 | 0.01≧ | 0.01≧ |
| $CO_2$ | (%) | 0.01≧ | 0.01≧ | 0.01≧ | 0.11 | 0.01≧ | 0.01≧ |
| Fe | (%) | 0.0004 | 0.0005 | 0.0348 | 0.1467 | 0.0834 | 0.1016 |
| Mn | (%) | 0.0001 | 0.0001 | 0.0018 | 0.0123 | 0.005 | 0.005 |
| Cu | (%) | 0.0001 | 0.0001 | 0.0001 | 0.0004 | 0.0001 | 0.0004 |
| V | (%) | 0.0001≧ | 0.0001≧ | 0.0001≧ | 0.0001≧ | 0.0001≧ | 0.0001≧ |
| Co | (%) | 0.0001 | 0.0001 | 0.0001 | 0.0001 | 0.0001≧ | 0.0001≧ |
| Ni | (%) | 0.0001 | 0.0001 | 0.0001 | 0.0001 | 0.0001≧ | 0.0001≧ |
| Cr | (%) | 0.0001 | 0.0001 | 0.0001 | 0.0001 | 0.0001 | 0.0001 |
| Stearic acid | (%) | — | 2.6 | 2.6 | 2.6 | 2.6 | 2.6 |

Comp. Example = Comparative Example

TABLE 10

| Magnesium hydroxide particles | Example A-VII | Comp. Example B-VI | Comp. Example B-VII | Comp. Example B-VIII | Comp. Example B-IX |
|---|---|---|---|---|---|
| Number of days passed before whitening | 36 | 9 | 6 | 7 | 8 |
| Izod impact strength (notched, kgf·cm/cm) | 18.5 | 14.9 | 11.8 | 13.6 | 15.7 |
| Tensile strength (kgf/mm$^2$) | 2.15 | 1.99 | 1.80 | 1.96 | 2.01 |
| 10 wt % weight reduction (hour) | 920 | 240 | 170 | 190 | 220 |
| Flame retardancy (UL 94VE ⅛ inch) | V-O | V-O | V-O | V-O | V-O |
| Izod impact strength (150° C. for 10 days, notched, kgf·cm/cm) | 16.6 | 1≧ | 1≧ | 1≧ | 1≧ |
| Tensile strength (150° C. for 10 days, kgf/mm$^2$) | 2.12 | 0.5≧ | 0.5≧ | 0.5≧ | 0.5≧ |

Comp. Example = Comparative Example

According to the present invention, when a large amount of magnesium hydroxide particles are filled in a thermoplastic resin, there can be obtained a resin composition and a molded article which do not deteriorate by heat, have excellent dispersibility and are not whitened. Therefore, it is possible to provide a resin composition and a molded article which contain no halogenated flame retardant and have such advantages as excellent workability and no generation of a toxic gas when the molded article is burnt.

What is claimed is:

1. A synthetic resin composition having heat deterioration resistance and flame retardancy, comprising:
   (a) a synthetic resin; and
   (b) magnesium hydroxide particles contained in a proportion of 15 to 80% by weight based on the total weight of (a) and (b), the magnesium hydroxide particles having (i) an average secondary particle diameter, measured by a laser diffraction scattering method, of not more than 2 μm, (ii) a specific surface area, measured by a BET method, of not more than 20 m$^2$/g, and containing (iii) a total amount of an iron compound and a manganese compound of not more than 0.02% by weight in terms of metals.

2. The synthetic resin composition of claim 1, wherein the magnesium hydroxide particles have an average secondary particle diameter, measured by a laser diffraction scattering method, of 0.4 to 1.0 μm.

3. The synthetic resin composition of claim 1, wherein the magnesium hydroxide particles have a specific surface area, measured by a BET method, of 1 to 10 m$^2$/g.

4. The synthetic resin composition of claim 1, wherein the magnesium hydroxide particles contain a total amount of an iron compound and a manganese compound of not more than 0.01% by weight in terms of metals.

5. The synthetic resin composition of claim 1, wherein the magnesium hydroxide particles contain a total amount of an iron compound, manganese compound, cobalt compound, chromium compound, copper compound, vanadium compound and nickel compound of not more than 0.02% by weight in terms of metals.

6. The synthetic resin composition of claim 1, wherein the magnesium hydroxide particles are contained in a proportion of 20 to 70% by weight based on the total weight of the synthetic resin and the magnesium hydroxide particles.

7. The synthetic resin composition of claim 1, wherein the synthetic resin is a polyolefin or a copolymer thereof.

8. The synthetic resin composition of claim 1, wherein the magnesium hydroxide particles are surface-treated with at least one surface treating agent selected from the group consisting of higher fatty acids, anionic surfactants, phosphoric acid esters, coupling agents and esters of polyhydric alcohols and fatty acids.

9. The synthetic resin composition of claim 1 which further contains (c) an auxiliary flame retardant in a proportion of 0.5 to 20% by weight based on the total weight of (a) the synthetic resin and (b) the magnesium hydroxide powders.

10. The synthetic resin composition of claim 9, wherein the auxiliary flame retardant is red phosphorus, carbon powder or a mixture thereof.

11. A flame retardant composed of magnesium hydroxide particles which have (i) an average secondary particle diameter, measured by a laser diffraction scattering method, of not more than 2 μm, (ii) a specific surface area, measured by a BET method, of not more than 20 m$^2$/g, and containing (iii) a total amount of an iron compound and a manganese compound of not more than 0.02% by weight in terms of metals.

12. The flame retardant of claim 11, wherein the magnesium hydroxide particles have an average secondary particle diameter, measured by a laser diffraction scattering method, of 0.4 to 1.0 μm.

13. The flame retardant of claim 11, wherein the magnesium hydroxide particles have a specific surface area, measured by a BET method, of 1 to 10 m$^2$/g.

14. The flame retardant of claim 11, wherein the magnesium hydroxide particles contain a total amount of an iron compound and a manganese compound of not more than 0.01% by weight in terms of metals.

15. The flame retardant of claim 11, wherein the magnesium hydroxide particles contain a total amount of an iron compound, manganese compound, cobalt compound, chromium compound, copper compound, vanadium compound and nickel compound of not more than 0.02% by weight in terms of metals.

16. A molded article of the synthetic resin composition of claim 1.

17. A synthetic resin composition having heat deterioration resistance and flame retardancy, comprising:
   (a) a synthetic resin; and
   (b) magnesium hydroxide particles contained in a proportion of 15 to 80% by weight based on the total weight of (a) and (b), the magnesium hydroxide particles having (i) an average secondary particle diameter, measured by a laser diffraction scattering method, of 0.4 to 1.0 μm, (ii) a specific surface area, measured by a BET method, of 1 to 10 m$^2$/g and containing (iii) a total amount of an iron compound and a manganese compound of not more than 0.01% by weight in terms of metals.

18. The synthetic resin composition of claim 17, wherein the magnesium hydroxide particles contain a total amount of an iron compound, manganese compound, cobalt compound, chromium compound, copper compound, vanadium compound and nickel compound of not more than 0.01% by weight in terms of metals.

19. The synthetic resin composition of claim 17, wherein the magnesium hydroxide particles are contained in a proportion of 20 to 70% by weight based on the total weight of the synthetic resin and the magnesium hydroxide particles.

20. The synthetic resin composition of claim 17, wherein the synthetic resin is a polyolefin or a copolymer thereof.

21. The synthetic resin composition of claim 17, wherein the magnesium hydroxide particles are surface-treated with at least one surface treating agent selected from the group consisting of higher fatty acids, anionic surfactants, phosphoric acid esters, coupling agents and esters of polyhydric alcohols and fatty acids.

22. The synthetic resin composition of claim 17 which further contains (c) an auxiliary flame retardant in a proportion of 0.5 to 20% by weight based on the total weight of (a) the synthetic resin and (b) the magnesium hydroxide powders.

23. The synthetic resin composition of claim 22, wherein the auxiliary flame retardant is red phosphorus, carbon powder or a mixture thereof.

24. A flame retardant composed of magnesium hydroxide particles which have (i) an average secondary particle diameter, measured by a laser diffraction scattering method, of 0.4 to 1.0 $\mu$m, (ii) a specific surface area, measured by a BET method, of 1 to 10.0 $m^2/g$, and containing (iii) a total amount of an iron compound and a manganese compound of not more than 0.01% by weight in terms of metals.

25. The flame retardant of claim 24, wherein the magnesium hydroxide particles contain a total amount of an iron compound, manganese compound, cobalt compound, chromium compound, copper compound, vanadium compound and nickel compound of not more than 0.01% by weight in terms of metals.

* * * * *

UNITED STATES PATENT AND TRADEMARK OFFICE
CERTIFICATE OF CORRECTION

PATENT NO.    : 6,025,424
DATED         : February 15, 2000
INVENTOR(S)   : Keiko Katsuki et al.

Page 1 of 1

It is certified that error appears in the above-identified patent and that said Letters Patent is hereby corrected as shown below:

<u>Title page,</u>
Please add the following priority information: -- [30] Foreign Application Priority Data, Dec. 19, 1995 [JP] Japan.....7-330,448 --

Signed and Sealed this

Ninth Day of July, 2002

Attest:

Attesting Officer

JAMES E. ROGAN
*Director of the United States Patent and Trademark Office*

(12) EX PARTE REEXAMINATION CERTIFICATE (4997th)
United States Patent
Katsuki et al.

(10) Number: US 6,025,424 C1
(45) Certificate Issued: Oct. 12, 2004

(54) HEAT DETERIORATION RESISTANT FLAME RETARDANT, RESIN COMPOSITION AND MOLDED ARTICLES

(75) Inventors: Keiko Katsuki, Sakaide (JP); Makoto Yoshii, Sakaide (JP)

(73) Assignee: Kyowa Chemical Industry Co., Ltd., Takamatsu (JP)

Reexamination Request:
No. 90/006,256, Mar. 26, 2002

Reexamination Certificate for:
Patent No.: 6,025,424
Issued: Feb. 15, 2000
Appl. No.: 09/044,004
Filed: Mar. 19, 1998

Certificate of Correction issued Jul. 9, 2002.

Related U.S. Application Data

(63) Continuation-in-part of application No. 08/767,634, filed on Dec. 17, 1996, now abandoned.

(30) Foreign Application Priority Data

Dec. 19, 1995 (JP) .............................................. 7-330448

(51) Int. Cl.$^7$ .............................. C08K 3/10; C01F 5/14
(52) U.S. Cl. ...................... 524/436; 423/635; 423/636; 524/80

(58) Field of Search ................... 524/436, 80; 423/625, 423/636

(56) References Cited

U.S. PATENT DOCUMENTS

| | | | |
|---|---|---|---|
| 4,098,762 A | * 7/1978 | Miyata et al. | ............. 260/45.7 |
| 5,286,285 A | 2/1994 | Meier et al. | ............. 106/18.26 |

OTHER PUBLICATIONS

G. Kirschbaum, R. Nykyforuk, Aluminum Hydroxide and Magnesium Hydroxide–New Developments and Their Applications in Polymer Compd., The Marketing of Polymer Modifiers and Addivities, East Brunswick, New Jersey, pp. 89–98, Regional Technical COnference on Society of Plastics Engineers (1991).

* cited by examiner

*Primary Examiner*—Edward J. Cain

(57) ABSTRACT

A flame retardant having heat deterioration resistance which is composed of magnesium hydroxide particles having (i) an average secondary particle diameter, measured by a laser diffraction scattering method, of not more than 2 $\mu$m, (ii) a specific surface area, measured by a BET method, of not more than 20 $m^2$/g and containing (iii) a total amount of an iron compound and a manganese compound of not more than 0.02% by weight in terms of metals, and a synthetic resin composition comprising the same and a molded article therefrom.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3–5, 13–15, 18 and 25 are cancelled.

Claims 1, 11, 17 and 24 are determined to be patentable as amended.

Claims 2, 6–10, 12, 16 and 19–23, dependent on an amended claim, are determined to be patentable.

1. A synthetic resin composition having heat deterioration resistance and flame retardancy, comprising:
   (a) a synthetic resin; and
   (b) magnesium hydroxide particles contained in a proportion of 15 to 80% by weight based on the total weight of (a) and (b), the magnesium hydroxide particles having
      (i) an average secondary particle diameter, measured by a laser diffraction scattering method, of not more than 2 μm,
      (ii) a specific surface area, measured by a BET method, of [not more than 20] *1 to 10* m$^2$/g, and containing
      (iii) a total amount of an iron compound [and a] *, manganese compound, cobalt compound, chromium compound, copper compound, vanadium compound and nickel compound* of not more than [0.02] *0.01%* by weight in terms of metals.

11. A flame retardant composed of magnesium hydroxide particles which have
    (i) an average secondary particle diameter, measured by a laser diffraction scattering method, of not more than 2 μm,
    (ii) a specific surface area, measured by a BET method, of [not more than 20] *1 to 10* m$^2$/g, and containing
    (iii) a total amount of an iron compound [and a] *, manganese compound, cobalt compound, chromium compound, copper compound, vanadium compound and nickel compound* of not more than [0.02] *0.01%* by weight in terms of metals.

17. A synthetic resin composition having heat deterioration resistance and flame retardancy, comprising:
    (a) a synthetic resin; and
    (b) magnesium hydroxide particles contained in a proportion of 15 to 80% by weight based on the total weight of (a) and (b), the magnesium hydroxide particles having
       (i) an average secondary particle diameter, measured by a laser diffraction scattering method, of 0.4 to 1.0 μm,
       (ii) a specific surface area, measured by a BET method, of 1 to 10 m$^2$/g and containing
       (iii) a total amount of an iron compound, [and a] *manganese compound, cobalt compound, chromium compound, copper compound, vanadium compound and nickel compound* of not more than 0.01% by weight in terms of metals.

24. A flame retardant composed of magnesium hydroxide particles which have
    (i) an average secondary particle diameter, measured by a laser diffraction scattering method, of 0.4 to 1.0 μm,
    (ii) a specific surface area, measured by a BET method, of 1 to 10.0 m$^2$/g, and containing
    (iii) a total amount of an iron compound, [and a] *manganese compound, cobalt compound, chromium compound, copper compound, vanadium compound and nickel compound* of not more than 0.01% by weight in terms of metals.

* * * * *